United States Patent [19]

Stumpp et al.

[11] 3,999,525
[45] Dec. 28, 1976

[54] APPARATUS FOR THE COLD STARTING AND WARMING RUN OF SPARK PLUG-IGNITED INTERNAL COMBUSTION ENGINES

[75] Inventors: Gerhard Stumpp; Josef Steiner, both of Stuttgart; Friedbert Michel, Kornwestheim, all of Germany

[73] Assignee: Robert Bosch G.m.b.H., Stuttgart, Germany

[22] Filed: Aug. 27, 1973

[21] Appl. No.: 391,612

Related U.S. Application Data

[63] Continuation of Ser. No. 201,901, Nov. 27, 1971, abandoned.

[30] Foreign Application Priority Data

Nov. 25, 1970   Germany .......................... 2057972

[52] U.S. Cl. .......................... 123/122 E; 123/34 A; 123/32 J; 123/122 F; 123/122 H; 123/179 L
[51] Int. Cl.² .......................................... F02B 3/00
[58] Field of Search ......... 123/34 A, 122 E, 122 H, 123/122 F, 32 J, 179 L; 239/13, 132, 135, 136

[56] References Cited

UNITED STATES PATENTS

| | | | |
|---|---|---|---|
| 1,780,499 | 11/1930 | Novelli | 123/32 J |
| 2,560,220 | 7/1951 | Graziano | 123/122 H |
| 2,668,900 | 2/1954 | Kwartz | 219/271 |
| 2,855,908 | 10/1958 | Pflaum | 123/32 J |
| 2,858,811 | 11/1958 | Bede | 123/32 J |
| 3,408,007 | 10/1968 | Raichle | 239/132 |
| 3,470,858 | 10/1969 | Mycroft | 123/122 |
| 3,504,657 | 4/1970 | Eichler | 123/32 J |
| 3,601,110 | 8/1971 | Kamazuka | 123/179 L |
| 3,683,871 | 8/1972 | Barr | 123/122 E |
| 3,731,876 | 5/1973 | Showalter | 239/13 |
| 3,762,378 | 10/1973 | Bitonti | 123/32 J |

*Primary Examiner*—Charles J. Myhre
*Assistant Examiner*—Ronald B. Cox
*Attorney, Agent, or Firm*—Edwin E. Greigg

[57] ABSTRACT

In each fuel injection valve forming part of a fuel injection apparatus and associated with an internal combustion engine, there is disposed an electric heater which transmits heat to the fuel by contact-type heat exchange. The heat output of each heater is controlled by a device which processes input signals representing different engine variables.

26 Claims, 2 Drawing Figures

APPARATUS FOR THE COLD STARTING AND WARMING RUN OF SPARK PLUG-IGNITED INTERNAL COMBUSTION ENGINES

This is a continuation of application Ser. No. 201,901, filed Nov. 24, 1971, now abandoned.

BACKGROUND OF THE INVENTION

This invention relates to an apparatus for the cold starting and warming run of externally ignited internal combustion engines and is of the type that electrically heats the fuel immediately adjacent the locus of injection and includes means which regulates its heat output in such a manner that the major portion of the fuel admitted for injection is transformed into a gaseous phase necessary for its combustion in the engine.

An apparatus of the aforenoted type has to avoid as much as possible or at least keep within permissible limits the emission of pollutants into the atmosphere for the protection of the environment and because of the ever stricter laws regarding air pollution.

It is known to heat the fuel under pressure to effect its vaporization upon expansion. Such a heating of the fuel prior to its admission in the suction tube is disclosed in German Patent Application Ser. No. D 71 833. Ia, while a heating of the fuel prior to its introduction into the combustion chamber is disclosed, for example, in German Pat. No. 905,902.

It is further known to enhance the heating of the fuel, in addition to the utilization of the engine heat and the exhaustion heat, by electrical heating means, as disclosed in German Pat. No. 929,884 or to effect such heating solely by electrical means, as disclosed in Austrian Pat. No. 197,133.

It is further known to control the heat output in accordance with the heat requirement as a function of the operational conditions of the engine, as disclosed in Austrian Pat. No. 127,239 and French Pat. No. 1,011,288.

It is, however, a common characteristic of all the aforenoted apparatuses which preheat fuel under pressure that they seek to facilitate the combustion of heavy oil in gasoline engines or they simply seek to improve the fuel preparation in Diesel engines and, even if they are concerned with the pressureless preheating of a mixture, cold starting and warm running must be ensured by additional means.

During cold starting of an engine, the fuel, the engine, as well as the fuel metering and preparing devices draw heat from the environment. Over the fuel there prevails, as over all liquids, a vapor pressure corresponding to its temperature and thus, the fresh combustion air flowing to the internal combustion engine is, dependent upon the vapor pressure and the period of contact, enriched with fuel vapor. At low temperatures this fuel concentration is not sufficient to form an ignitable mixture, so that for the same duration of contact a larger fuel surface has to be provided in order to reach the temperature limit of ignitability. In conventional cold starting apparatuses associated with carburetor or intake tube injection systems, this results in the introduction of fuel quantities during the period of cold starting that are 30–50 times more than those for normal operation. Consequently, there will be commensurate effects of pollutant emission, lubricating oil thinning and fuel consumption. During the warming run of the engine, these additional fuel quantities are then gradually decreased as the engine temperature increases, until the operating temperature of the engine has reached its normal value.

OBJECT, SUMMARY AND ADVANTAGES OF THE INVENTION

It is an object of the invention to provide an improved apparatus for the cold starting and warming run of an engine operating on Otto-fuel to ensure, without additional fuel quantities, a combustion and an rpm increase to idling run possibly from the first compression stroke on and to effect a warming run without enriching the fuel mixture.

Briefly stated, according to the invention, means are provided to effect the heating of the fuel during cold or temporarily cool engine as a function of the engine temperatures that govern the fuel mixture preparation.

The advantages that may be achieved with the invention reside particularly in the fact that the emission of pollutants during cold engine operation or warming run is not higher than during normal engine operation and that the apparatus is of much simpler construction than conventional devices.

The invention will be better understood, as well as further objects and advantages will become more apparent, from the ensuing detailed specification of a preferred, although exemplary, embodiment of the invention taken in conjunction with the drawing.

DESCRIPTION OF THE PREFERRED EMBODIMENT

Figure 1:
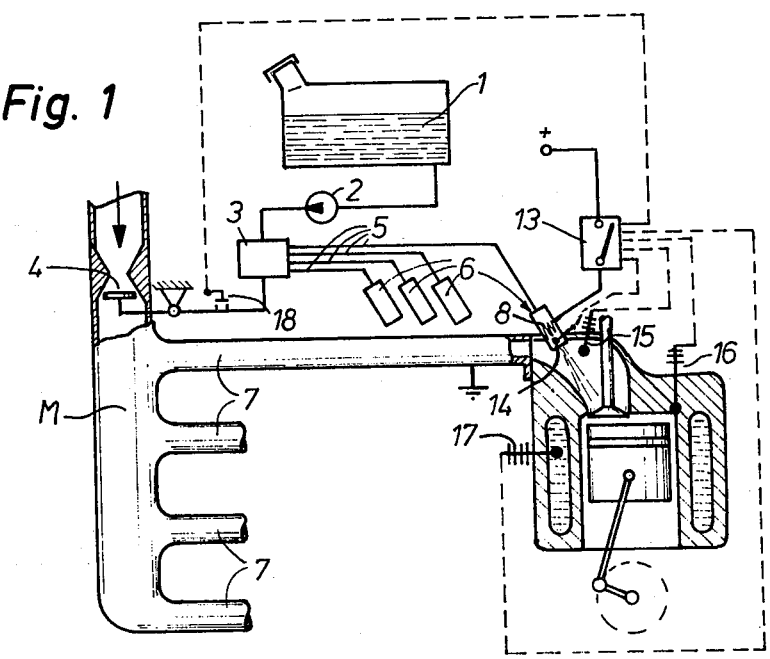
FIG. 1 is a schematic illustration of a fuel injection system incorporating the preferred embodiment of the apparatus for cold starting and warming run and FIG. 2 is a longitudinal sectional view on an enlarged scale of one component shown in FIG. 1.
Figure 2:
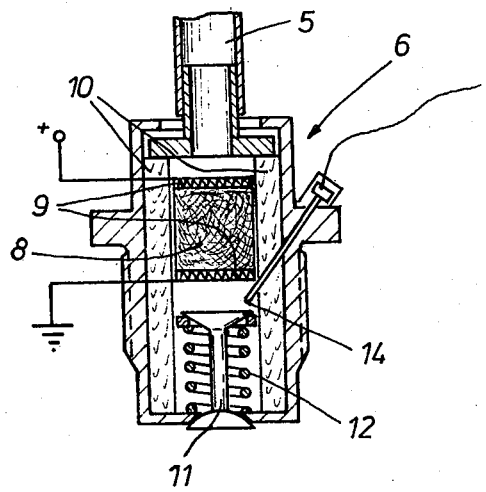

Turning now to the figures, from a fuel tank 1 fuel is delivered by a fuel pump 2 to a fuel metering device 3. An air sensor throttle 4 disposed in the intake manifold M senses the throughgoing air quantities and, as a function thereof, the fuel metering device 3 meters fuel that is admitted to the fuel injection valves 6 through pressure conduits 5. The fuel injection valves 6 inject fuel into the individual intake tubes 7 of the internal combustion engine. In each fuel injection valve 6 there is situated a heater 8 provided with electric conductors 9 and a heat insulation 10 for a good thermal separation of the heater 8 from the surrounding components of the engine.

The fuel-filled space of each fuel injection valve 6 is closed off by a valve needle 11, the opening pressure for which is determined by a closing spring 12 urging the valve needle 11 into its closed position.

The heat output of the heater 8 is regulated by a control device 13 which receives signals from temperature sensors 14, 15, 16, 17 and from a switch 18. The temperature sensor 14 monitors the maximum fuel temperature in the fuel injection valve 6 downstream of the heater. The temperature sensor 15 is responsive to the temperature of the intake air at the location of injection, the sensor 16 is responsive to the temperature of the cylinder head, while the sensor 17 is responsive to the temperature of the coolant in water-cooled engines. Switch 18 transmits a signal when there is an air flow in the intake manifold and thus indicates whether the engine is running or whether it is at a standstill.

OPERATION OF THE PREFERRED EMBODIMENT

As the fuel flows through the fuel injection valve 6, the electrical heating body 8 heats it to a temperature at which a preponderant portion of the fuel is vaporized as it expands in the intake conduit subsequent to injection. To enhance a good atomization of the fuel, the opening pressure of the fuel injection valve is selected in such a manner that upon the expansion of fuel it will travel at sonic speeds in the narrowest cross section. As it is known, such speed conditions will prevail when the ratio between the opening pressure and the pressure of the suction chamber is larger than or equal to the critical pressure ratio. The upper limit value of the fuel temperature is set by the safety requirement that the mixture in the suction chamber must not reach the temperature of self ignition.

In order to enhance a rapid functioning of the heater body at the moment of cold starting, the heater body preferably has a small mass and a large surface of contact. For this purpose it was found to be advantageous to use a heater body which is formed of a great plurality of capillary tubes or is a closely slitted material, such as a whisker packet.

The heat output is controlled by the control device 13 so as to meet the aforenoted temperature requirements. For this purpose the device 13 processes the signals transmitted by the sensors 14–17.

The extent of heat output and its duration may also be made dependent on additional engine variables such as engine rpm, load, external temperature, cooling air temperature, combustion chamber temperature, exhaust gas temperature or the combination thereof. Heat output is supplied during normal engine operation at all times when the temperature conditions of the engine require it, for example, after an extended downhill travel.

In order to achieve the goal of an as small a pollutant emission as possible and to avoid an overheating of the heater body 8, the control device 13, by processing the signals from the switch 18, provides that the heater 8 is energized only when the engine runs. Otherwise, the heating of the fuel and the volume increase connected therewith could cause the pressure in the fuel chamber of the fuel injection nozzle to attain the opening pressure and consequently, an uncontrolled fuel injection could take place.

It is also possible to provide a heat control device wherein the effect of the signals from the switch 18 are eliminated for cold starting, so that the fuel may be heated prior to the operation of the engine starter.

Several functions which are shown individually in the drawing for clarity, may be combined in the actual structure. For this purpose, for example, in case of an electric resistance heater, the temperature-dependence of the resistance material may be selected in such a manner (cold conductor) that the control of the fuel temperature is effected directly (i.e. by means of a heater-fuel contact) without the intermediary of the sensor 14 and the control device 13.

That which is claimed is:

1. An apparatus including a plurality of fuel injection valves forming part of a fuel injection system for externally ignited internal combustion engines for electrically heating fuel directly ahead of the injection location of the fuel during cold starting and warming run of the internal combustion engine, the improvement comprising:

A. a heater body disposed in at least one valve of said fuel injection valves in a heat exchanging relationship with fuel passing through said fuel injection valve;
   B. electrical supply means for providing current;
   C. temperature sensing means responsive to at least one varying temperature characterizing the engine operation for producing a control signal which varies as a function of the temperature sensed; and
   D. at least one control means in circuit between said electrical supply means, said heater body and said temperature sensing means for controlling the heat output of the heater body, said temperature sensing means being connected in said circuit to said control device for applying the variable control signal thereto indicative of the temperature sensed, such that said heater body is automatically switched on in dependence on the temperature sensed not only during cold starting of the engine but also during the operation of the engine when the engine is temporarily cooled down so that the preponderant portion of the fuel to be delivered to the combustion chambers of the engine is converted into the gaseous phase required for combustion upon expansion subsequent to its injection by said fuel injection valve, wherein said temperature sensing means includes a temperature sensor positioned in said valve downstream of said heater body for producing a control signal in response to fuel temperature, and wherein said control means includes a control input coupled to said temperature sensor and responsive to the control signal therefrom for controlling current applied to said heater body.

2. An apparatus as defined in claim 1, wherein said heater body is formed of a plurality of capillary tubes.

3. An apparatus as defined in claim 2, wherein said heater body is formed as a whisker packet.

4. An apparatus as defined in claim 2, including means for thermally insulating said heater body from the associated fuel injection valve.

5. An apparatus as defined in claim 1, including a valve needle disposed in each fuel injection valve and a spring urging the valve needle into a closed position, the force of said spring being so selected that upon opening of said valve and expansion of said fuel, the speed of the latter in the narrowest flow passage section downstream of the valve corresponds to the speed of sound.

6. An apparatus as defined in claim 1, including means for sensing a running condition and a standstill condition of said engine, and wherein said control means includes a control input coupled to said last-named means for disabling same under standstill condition thereby limiting energization of said heater body to periods when said engine is running.

7. An apparatus as defined in claim 6, wherein said engine includes an intake manifold, and wherein said means for sensing the running condition and the standstill condition comprises an air sensor disposed in said intake manifold, said last-named means being connected to said air sensor to determine the running condition and the standstill condition of said engine by the air flow conditions in said intake manifold.

8. An apparatus for cold starting and warming run of an internal combustion engine, said apparatus forming part of a fuel injection system which includes a plurality of fuel injection valves, the improvement comprising:

A. a heater body formed as an electric resistance heater disposed in at least one valve of said fuel injection valves in a heat exchanging relationship with fuel passing through said fuel injection valve;
B. electrical supply means for providing current;
C. at least one control means in circuit between said electrical supply means and said heater body for controlling the heat output of said heater; and
D. temperature sensing means responsive to at least one varying temperature characterizing the engine operation, said temperature sensing means being connected to said control device for applying signals thereto, wherein said heater body is made of a material (PTC- material) having a special temperature-dependent resistance and serves simultaneously as a further control means, and wherein the maximal temperature of said electric resistance heater and thereby its heat output are controlled by the special temperature-dependence of its resistance.

9. An apparatus as defined in claim 8, further comprising a chamber coupled to an air intake tube and into which said fuel injection valve feeds, wherein said temperature sensing means includes a temperature sensor positioned in said chamber for producing a control signal in response to temperature of intake air, and wherein said control means includes a control input coupled to said temperature sensor and responsive to the control signal therefrom for controlling current supplied to said heater body.

10. An apparatus as defined in claim 8, further comprising a cylinder head, wherein said temperature sensing means includes a temperature sensor positioned in said cylinder head for producing a control signal in response to temperature of said cylinder head, and wherein said control means includes a control input coupled to said temperature sensor and responsive to the control signal therefrom for controlling current supplied to said heater body.

11. An apparatus as defined in claim 8, further comprising a coolant passageway, wherein said temperature sensing means includes a temperature sensor positioned in said coolant passageway for producing a control signal in response to temperature of the coolant, and wherein said control means includes a control input coupled to said temperature sensor and responsive to the control signal therefrom for controlling current supplied to said heater body.

12. An apparatus including a plurality of fuel injection valves forming part of a fuel injection system for externally ignited internal combustion engines for electrically heating fuel directly ahead of the injection location of the fuel during cold starting and warming run of the internal combustion engine, the improvement comprising:
A. a heater body disposed in at least one valve of said fuel injection valves in a heat exchanging relationship with fuel passing through said fuel injection valve;
B. electrical supply means for providing current;
C. first temperature sensing means positioned in the vicinity of said heater body downstream therefrom for producing a first control signal in response to fuel temperature, which signal varies as a function of the fuel temperature sensed; and
D. control means in circuit between said electrical supply means said heater body and said first temperature sensing means, said control means having a first control input coupled to said first temperature sensing means and responsive to the first control signal for controlling current supplied from said supply means to said heater body and consequently the heat output of the heater body as a function of fuel temperature to automatically switch on said heater body not only during cold starting of the engine but also during the operation of the engine when the engine is temporarily cooled down to cause a preponderant portion of the fuel to assume its gaseous state for combustion upon expansion subsequent to its injection by said fuel injection valve.

13. An apparatus as defined in claim 12, wherein said heater body is formed of a plurality of capillary tubes.

14. An apparatus as defined in claim 13, wherein said heater body is formed as a whisker packet.

15. An apparatus as defined in claim 13, including means for thermally insulating said heater body from the associated fuel injection valve.

16. An apparatus as defined in claim 12, wherein said heater body is formed as an electric resistance heater made of a material having a temperature-dependent resistance, heat output of said electric resistance heater being substantially directly related to temperature of the fuel as sensed by said first temperature sensing means.

17. An apparatus as defined in claim 12, including a valve needle disposed in each fuel injection valve and a spring urging the valve needle into a closed position, the force of said spring being so selected that upon opening of said valve and expansion of said fuel, the speed of the latter in the narrowest flow passage section downstream of the valve corresponds to the speed of sound.

18. An apparatus as defined in claim 12, including means for sensing a running condition and a standstill condition of said engine, said last-named means being connected to a further input of said control device for disabling same under standstill condition thereby limiting energization of said heater body to periods when said engine is running.

19. An apparatus as defined in claim 18, wherein said engine includes an intake manifold and wherein said means for sensing the running condition and the standstill condition comprises an air sensor disposed in said intake manifold said last-named means being connected to said air sensor to determine the running condition and the standstill condition of said engine by the air flow conditions in said intake manifold.

20. An apparatus for cold starting and warming run of an internal combustion engine, said apparatus forming part of a fuel injection system which includes a plurality of fuel injection valves, the improvement comprising:
A. a heater body disposed in at least one valve of said fuel injection valves in a heat exchanging relationship with fuel passing through said fuel injection valve;
B. electrical supply means for providing current;
C. at least one control means in circuit between said electrical supply means and said heater body for controlling the heat output of said heater body;
D. temperature sensing means responsive to at least one varying temperature characterizing the engine operation, said temperature sensing means being connected to said control device for applying signals thereto; and E. a chamber coupled to an air intake tube and into which said fuel injection valve feeds, wherein:
   i. said temperature sensing means includes a temperature sensor positioned in said valve downstream of said heater body for producing a control signal in response to fuel temperature and a temperature sensor positioned in said chamber for producing a control signal in response to the temperature of intake air; and
   ii. said control means includes a control input coupled to said temperature sensors and responsive to the control signals therefrom for controlling current supplied to said heater body.

21. An apparatus for cold starting and warming run of an internal combustion engine, said apparatus forming part of a fuel injection system which includes a plurality of fuel injection valves, the improvement comprising:
   A. a heater body disposed in at least one valve of said fuel injection valves in a heat exchanging relationship with fuel passing through said fuel injection valve;
   B. electrical supply means for providing current.
   C. at least one control means in circuit between said electrical supply means and said heater body for controlling the heat output of said heater body;
   D. temperature sensing means responsive to at least one varying temperature characterizing the engine operation, said temperature sensing means being connected to said control device for applying signals thereto; and
   E. a cylinder head, wherein:
      i. said temperature sensing means includes a temperature sensor positioned in said valve downstream of said heater body for producing a control signal in response to fuel temperature and a temperature sensor positioned in said cylinder head for producing a control signal in response to the temperature of said cylinder head; and
      ii. said control means includes a control input coupled to said temperature sensors and responsive to the control signals therefrom for controlling current supplied to said heater body.

22. An apparatus for cold starting and warming run of an internal combustion engine, said apparatus forming part of a fuel injection system which includes a plurality of fuel injection valves, the improvement comprising:
   A. a heater body disposed in at least one valve of said fuel injection valves in a heat exchanging relationship with fuel passing through said fuel injection valve;
   B. electrical supply means for providing current;
   C. at least one control means in circuit between said electrical supply means and said heater body for controlling the heat output of said heater body;
   D. temperature sensing means responsive to at least one varying temperature characterizing the engine operation, said temperature sensing means being connected to said control device for applying signals thereto; and
   E. a coolant passageway, wherein:
      i. said temperature sensing means includes a temperature sensor positioned in said valve downstream of said heater body for producing a control signal in response to fuel temperature and a temperature sensor positioned in said coolant passage for producing a control signal in response to the temperature of the coolant; and
      ii. said control means includes a control input coupled to said temperature sensors and responsive to the control signals therefrom for controlling current supplied to said heater body.

23. An apparatus for cold starting and warming run of an internal combustion engine, said apparatus forming part of a fuel injection system which includes a plurality of fuel injection valves, the improvement comprising:
   A. a heater body disposed in at least one valve of said fuel injection valves in a heat exchanging relationship with fuel passing through said fuel injection valve;
   B. electrical supply means for providing current;
   C. first temperature sensing means positioned in the vicinity of said heater body downstream therefrom for producing a first control signal in response to fuel temperature;
   D. control means in circuit between said electrical supply means and said heater body, said control means having a first control input coupled to said first temperature sensing means and responsive to the first control signal for controlling current supplied from said supply means to said heater body as a function of fuel temperature to cause a preponderant portion of the fuel to assume its gaseous state upon expansion subsequent to its injection by said fuel injection valve;
   E. a chamber coupled to an air intake tube and into which said fuel injection valve feeds; and
   F. a further temperature sensing means positioned in said chamber for producing a further control signal in response to the temperature of intake air, wherein said control means includes a further control input coupled to said further temperature sensing means and responsive to the further control signal therefrom for further controlling current supplied to said heater body.

24. An apparatus for cold starting and warming run of an internal combustion engine, said apparatus forming part of a fuel injection system which includes a plurality of fuel injection valves, the improvement comprising:
   A. a heater body disposed in at least one valve of said fuel injection valves in a heat exchanging relationship with fuel passing through said fuel injection valve;
   B. electrical supply means for providing current;
   C. first temperature sensing means positioned in the vicinity of said heater body downstream therefrom for producing a first control signal in response to fuel temperature;
   D. control means in circuit between said electrical supply means and said heater body, said control means having a first control input coupled to said first temperature sensing means and responsive to the first control signal for controlling current supplied from said supply means to said heater body as a function of fuel temperature to cause a preponderant portion of the fuel to assume its gaseous state upon expansion subsequent to its injection by said fuel injection valve;
   E. a cylinder head; and
   F. a further temperature sensing means positioned in said cylinder head for producing a further control signal in response to the temperature of said cylinder head, wherein said control means includes a further control input coupled to said further temperature sensing means and responsive to the further control signal therefrom for further controlling current supplied to said heater body.

25. An apparatus for cold starting and warming run of an internal combustion engine, said apparatus forming part of a fuel injection system which includes a plurality of fuel injection valves, the improvement comprising:
   A. a heater body disposed in at least one valve of said fuel injection valves in a heat exchanging relationship with fuel passing through said fuel injection valve;
   B. electrical supply means for providing current;
   C. first temperature sensing means positioned in the vicinity of said heater body downstream therefrom for producing a first control signal in response to fuel temperature;
   D. control means in circuit between said electrical supply means and said heater body, said control means having a first control input coupled to said first temperature sensing means and responsive to the first control signal for controlling current supplied from said supply means to said heater body as a function of fuel temperature to cause a preponderant portion of the fuel to assume its gaseous state upon expansion subsequent to its injection by said fuel injection valve;
   E. a coolant passageway; and
   F. a further temperature sensing means positioned in said coolant passageway for producing a further control signal in response to the temperature of the coolant, wherein said control means includes a further control input coupled to said further temperature sensing means and responsive to the further control signal therefrom for further controlling current supplied to said heater body.

26. An apparatus as defined in claim 12, including means for setting an upper temperature for said fuel.

* * * * *